United States Patent [19]
Guadano, Sr.

[11] 3,992,038
[45] Nov. 16, 1976

[54] SHOPPING CART

[76] Inventor: Bernard Guadano, Sr., P.O. Box 112, Seaford, N.Y. 11783

[22] Filed: July 10, 1975

[21] Appl. No.: 594,665

[52] U.S. Cl. .............................................. 280/659
[51] Int. Cl.² .......................................... B62B 3/02
[58] Field of Search ............. 280/41 R, 41 A, 41 B, 280/36 R, 36 B, DIG. 3, 659

[56] References Cited
UNITED STATES PATENTS

| | | | |
|---|---|---|---|
| 2,967,716 | 1/1961 | Murcott | 280/41 R |
| 3,633,932 | 1/1972 | Holden | 280/36 R |
| 3,873,116 | 3/1975 | Perego | 280/36 R |

Primary Examiner—Robert R. Song
Attorney, Agent, or Firm—Bauer, Amer & King

[57] ABSTRACT

A shopping cart which folds from a bag-supporting condition into a noteworthy compact storage condition in response to pivotal closing movement of its handle. Specifically, the pivotal traverse of the handle produces a scissors-type closing movement in the criss-crossing sides of the cart, and also lifts a two-piece bag-supporting bottom of the cart along a hinge axis, so that said two pieces fold together, all to the end of providing a compact arrangement of the parts during non-use of the cart.

6 Claims, 6 Drawing Figures

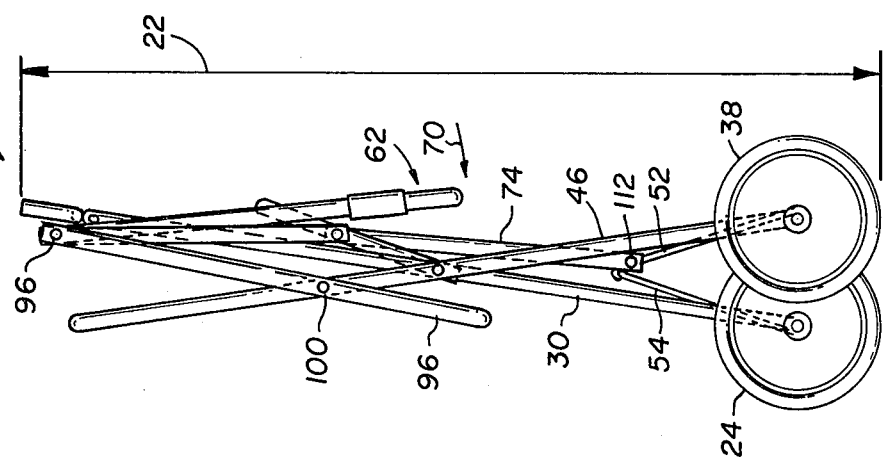
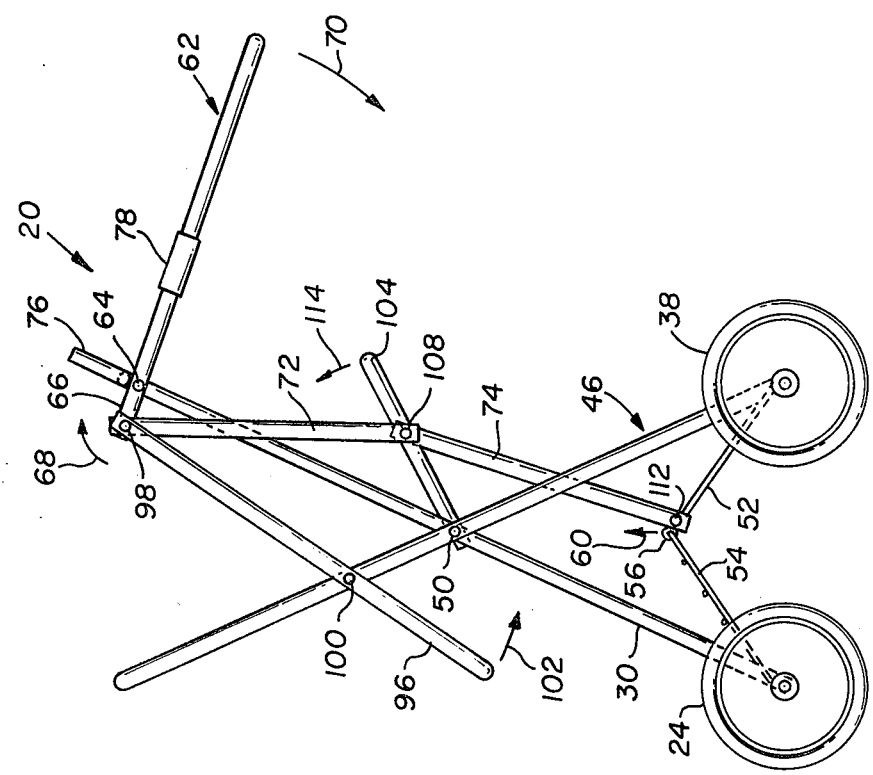

SHOPPING CART

The present invention relates generally to a folding cart, such as is commonly used for shopping, transporting laundry, and similar chores, and more particularly to improvements which reduce the storage, or folded size of the cart, its manufacturing cost, as well as providing other noteworthy benefits.

A typical known shopping cart consists of body members which are supported on an inverted U-shaped handle so as to bound a load-carrying compartment, and which further are arranged to move into position adjacent the handle thereby permitting the cart to fold into a compact storage condition. An example of such a product is the cart of U.S. Pat. No. 3,191,956. While the folded size of the cart is significantly less than its unfolded size, it still has one dimension that is essentially the unchanged size of the handle, which may typically be approximately 40 inches. This renders the cart, even when folded, somewhat difficult to handle, as well as to store, as in a vehicle trunk or other confined area. Also, the use of bent wire or similar construction materials for the cart body members adds to its weight which, with its size, further detracts from the ease of use of the cart.

Broadly, it is an object of the present invention to provide an improved cart, particularly for grocery shopping and similar chores, overcoming the foregoing and other shortcomings of the prior art. Specifically, it is an object to provide a shopping cart which is arranged to advantageously utilize a shopping bag for load-carrying, and which folds into a significantly reduced size about the emptied shopping bag incident to storage of the cart.

A shopping or laundry-transporting cart demonstrating objects and advantages of the present invention includes front and rear wheels respectively joined by front and rear axles, wherein the axles support intersecting side frame members pivoted to each other to provide scissors-type opening and closing movements therebetween so as to enable said shopping cart to fold from an open condition into a closed storage condition. Additionally, the axles support a pair of members hinged to form a bottom for the cart. Completing the cart is a handle pivotally connected adjacent the top of said rearwardly angled side frame member and having its pivoting end connected to a bottom-folding member operatively connected at its other end to the hinge of said bottom pair of members, whereby incident to pivotal movement of the handle into its storage position, the bottom is correspondingly folded into its storage condition, and wherein said folding movement also causes closing movement of said intersecting side frame members, to thereby effectively collapse the cart into a compact storage condition.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIGS. 4 and 5 are similarly side elevational views which progressively show the manner in which the shopping cart is converted from its open bag-supporting condition into its closed compact storage condition.

Figure 2:
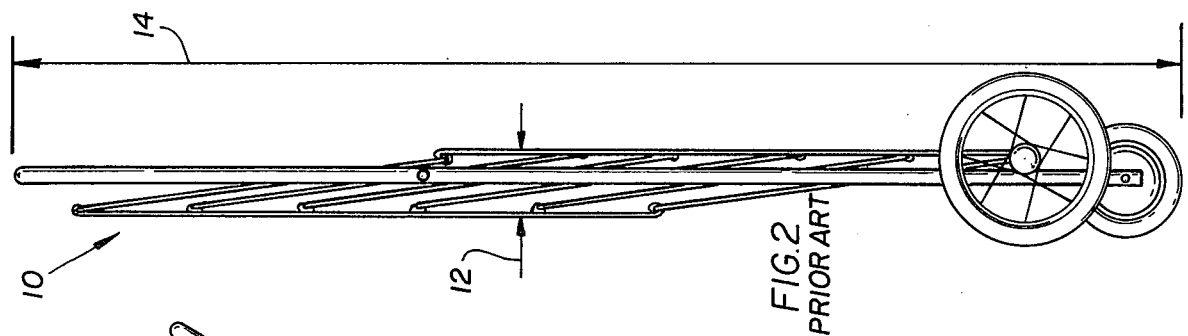
FIGS. 1 and 2 are side elevational views of a typical prior art shopping cart, FIG. 1 being the open condition thereof and FIG. 2 being its closed compact storage condition.
Figure 1:
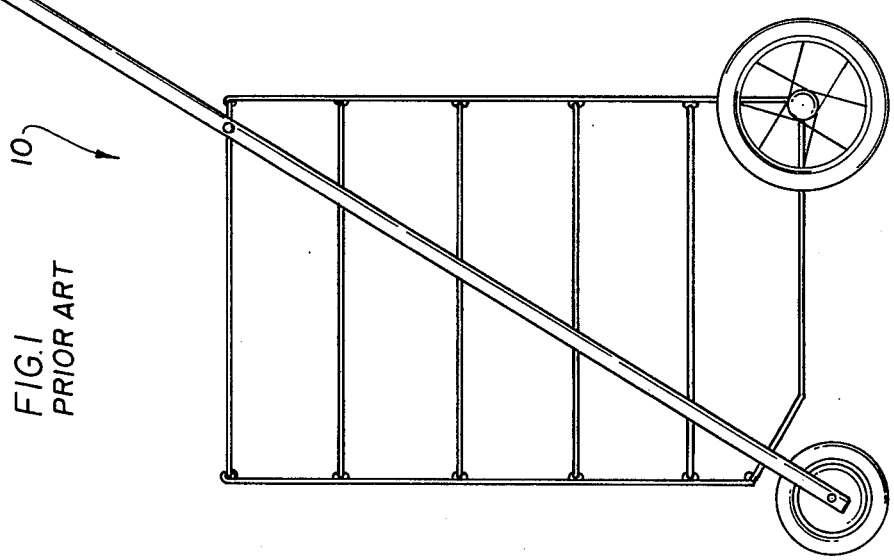

The shopping cart hereof, illustrated in FIGS. 3–6, is an improved version of the type of shopping cart which has a load-carrying or open, unfolded condition which is used during a typical shopping excursion, and also a compact storage condition when the cart is not in use. As an example of a known shopping cart having this capacity to assume a compact storage condition, with its obvious space saving benefits, reference should be made to FIGS. 1 and 2. The prior art shopping cart, generally designated 10 therein can be folded from the condition shown in FIG. 1 into the compact storage condition illustrated in FIG. 2. However, even the storage condition of the cart 10, although it is significantly reduced in its width 12, the height of the cart, designated by the reference numeral 14, is excessive, being typically approximately 41 inches. Said prior art cart 10 having this dimension is unwieldly to handle, and is a problem to carry and store in a vehicle trunk or other confined compartment.

In contrast to the foregoing, the improved shopping cart hereof, generally designated 20, having the same load-carrying capacity as the prior art cart 10, in its closed compact storage condition, as illustrated in FIG. 5, has a significantly reduced height 22 of only approximately 30 inches. It has been found that the significantly reduced size of the cart 20 in its closed compact storage position contributes to facilitated handling of the cart, and readily permits it to be carried in a vehicle trunk compartment, the back of a station wagon, and in other such confined areas.

Figure 3:
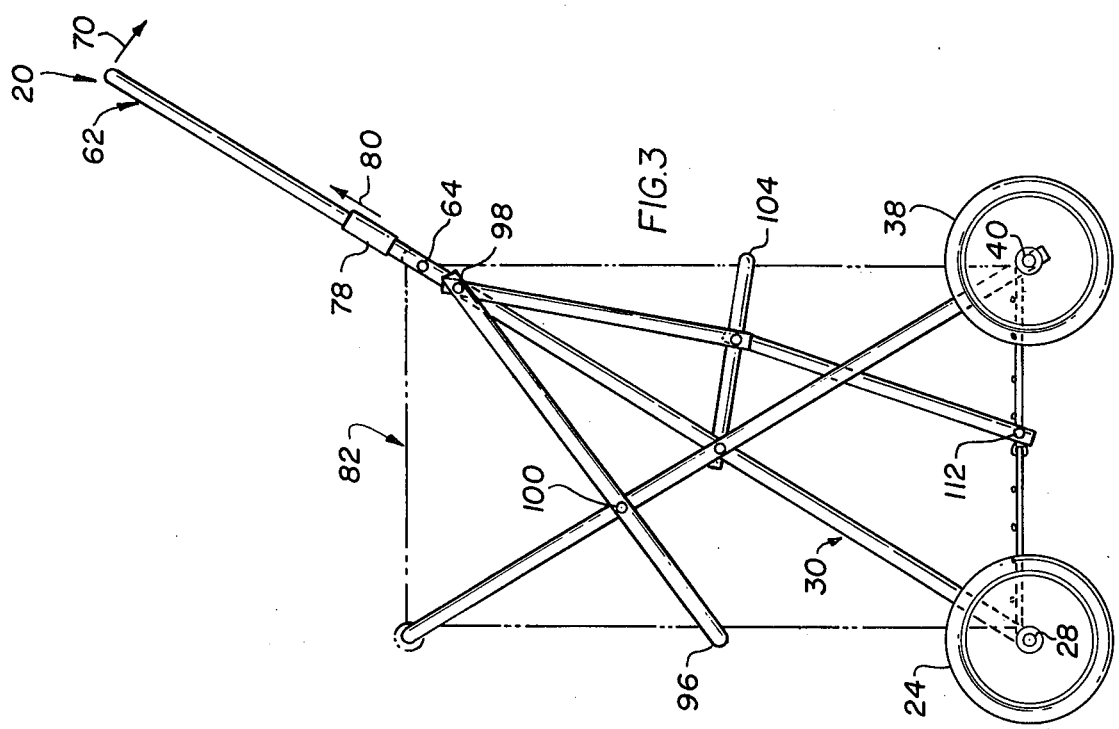
FIG. 3 is a side elevational view of the improved shopping cart hereof in its open operative condition, wherein the shopping bag used in conjunction with the cart is shown in phantom line perspective.
Figure 6:
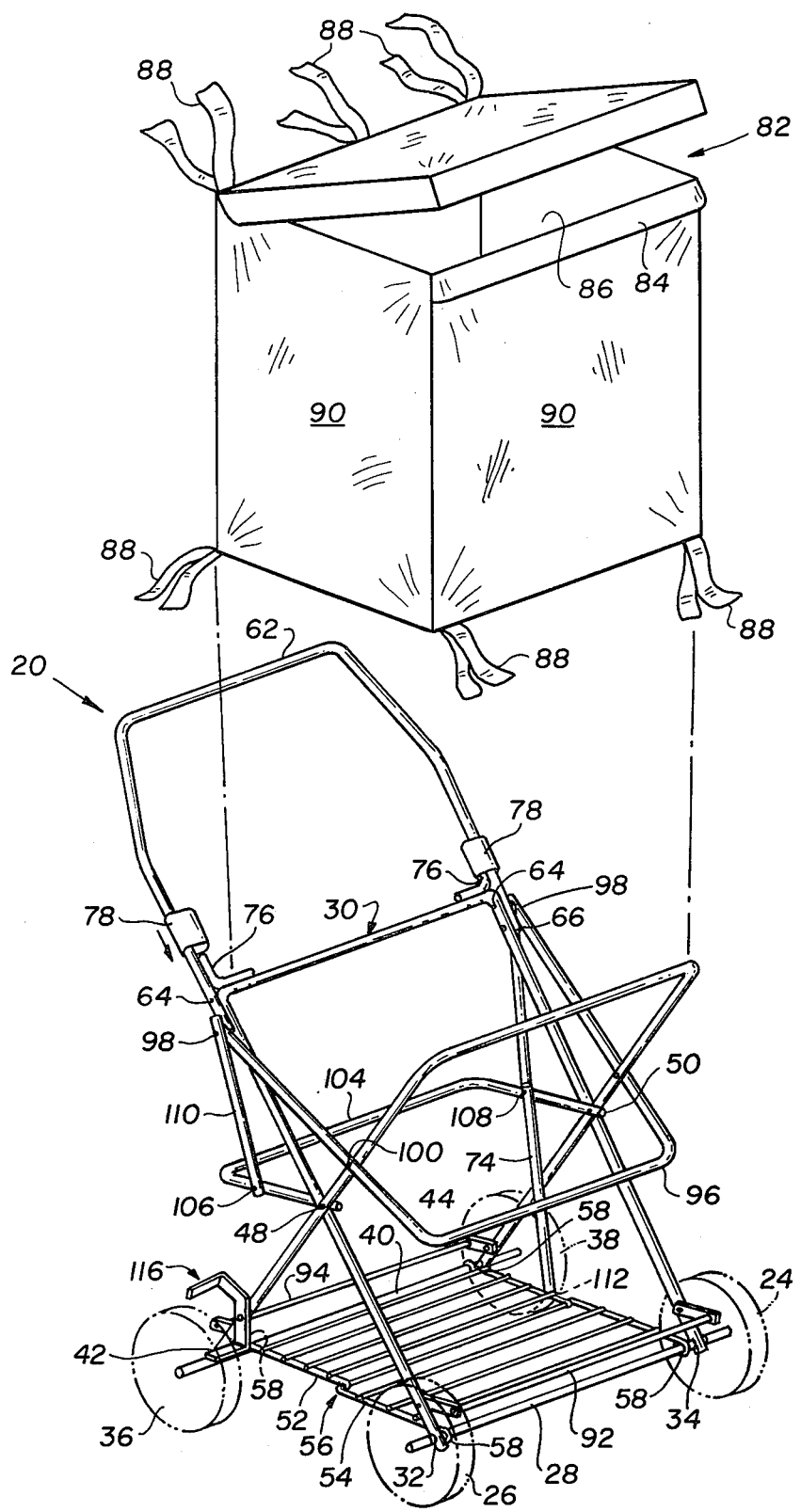
FIG. 6 is a perspective view of the shopping cart hereof, and of the shopping bag used in conjunction with said cart, illustrating further structural details.

Referring now specifically to FIGS. 3–6, cart 20 includes a front pair of wheels 24, 26 having a front axle 28 connected in spanning relation therebetween. Axle 28 acts as a support for a U-shaped frame member 30, as at the support points 32, 34. The frame 30 in the open or bag-carrying condition of the cart 20 has a rearwardly inclined or angled orientation, as best illustrated in FIGS. 3, 6.

Cart 20 also has a pair of rear wheels 36 and 38 which similarly has a rear axle 40 connected therebetween. Axle 40 also acts as a support, as at points 42 and 44 (see in particular FIG. 6), for a second cooperating frame member 46 which, in the bag-supporting condition of the cart 20 has a forwardly inclined or angled orientation. At the intersection of the frame members 30 and 46, as at points 48 and 50, these frame members are pivotally interconnected so as to partake of pivotal movements about their pivotal interconnections. As a consequence, and as best illustrated in FIG. 4, the frame members 30 and 46 partake of scissors-type movement towards and away from each other, the movement towards each other contributing to the ability of these frame members to provide a compact storage condition to the cart 20, as illustrated by progressive examination of FIGS. 4 and 5.

To provide the scissors-type closing movement to the frame members 30 and 46, and also to support the load of the cart 20, use is made of a hinged bottom connected in spanning relation between the front and rear axles 28 and 40, respectively. The preferred form of this bottom consists of two bent wire or similarly constructed members 52 and 54 hinged at their confronting edges, as at 56, and at their opposite edges each appropriately mounted, as at 58, to the front and rear axles 28, 42, respectively. As is perhaps best illustrated in FIG. 6, when the hinge 56 is lifted, as in the direction 60, the members 52, 54 fold together into adjacent positions, providing a compact arrangement thereof, and this movement simultaneously provides corresponding closing movement of the frame members 30 and 46 towards each other, to thereby in turn provide the compact condition to the cart 20 that is illustrated in FIG. 5.

To produce the folding movements in the bottom members 52 and 54, and also the closing movements in the frames 30 and 46, use is made, at least in part, of a pivotally mounted handle 62, the pivot connection of which is strategically located adjacent the top of frame member 30, as at 64. More specifically, the hand grip of handle 62 is provided along the closed end 64 thereof, as best illustrated in FIG. 6, while its opposite ends 66 extend beyond the pivots 64 and are urged through pivotal traverses 68 when handle 62 partakes of closing movement 70 from its upright position, as illustrated in FIG. 3, into its compact storage condition as illustrated in FIG. 5.

Connected between bottom members 52, 54 and at least one pivoting end 66 of the handle 62 are two linkage members 72, 74 which, as a result of the connections just indicated, function effectively as a bottom-folding member. That is, during closing movement 70 of the handle 62, the pivotal traverse 68 of the pivot end 66 thereof draws up on the members 72, 74 and, in turn, causes lifting movement 60 of the hinge 56 which, as already indicated, produces folding movement in the members 52, 54 and also closing movement in the frames 30, 46.

As best illustrated in FIGS. 3 and 6, the position of the handle 62 during shopping use of the cart 20, is one in which it preferably assumes the same angular orientation as the frame member 30. To achieve this, L-shaped brackets 76 are connected at opposite ends of the closed end of the frame 30 so that the handle 62, and more particularly the side arms thereof, can be moved into alignment with the upstanding legs of the brackets 76. When this is achieved, holding sleeves 78 slidably mounted on the arms of the handle 62 are moved into engaging position over the upstanding legs of the brackets 76, as illustrated in FIG. 6, to thereby hold the handle 62 in a rearwardly angled orientation in which it is convenient for wheeling and moving the cart about. However, when it is desired to close the cart 20, the sleeves 78 are moved up along the handle 62, as in the direction 80 (see FIG. 3), thereby freeing the handle 62 for closing movement 70 about the pivots 64.

At this point in the description it is convenient to note that it is contemplated using the cart 20 in conjunction with a shopping bag, generally designated 82, which is supported on the cart 20 in any appropriate manner. For example, bag 82 in a preferred embodiment, includes a front flap 84 which fits over the closed upper end of the frame 46. At the rear of the bag 82, and specifically along the edge which bounds the opening 86 into the bag, there are strategically located ties 88 to attach this portion of the bag along the closed upper end of the frame 30. The body panels 90 of the bag thus vertically suspend from the upper portions of the frame 30 and 46, and results in the bottom of the bag being supported on the bottom panels 52, 54. Tie rods 92 and 94 are appropriately connected in spanning relation adjacent the axles 28 and 40, respectively, and the bag 82 is provided with additional ties 88 for connection to these tie rods.

During use of the cart 20, during a shopping excursion, or even during use of the cart to transport laundry to and from a laundromat, or other such similar uses, it is contemplated that the cart will have to surmount steps, and possibly be moved up or down inclines. Accordingly, it is advisable to provide structure for maintaining the bag 82 in its generally vertical orientation within the space bounded by the frames 30 and 46, despite any change in orientation in the cart 20. To achieve this, use is made of a front bag-supporting U-shaped member 96 which is arranged so that the closed end thereof blocks or functions as a stop which limits forward movement of the bag 82. Member 96 is advantageously connected to a common pivot 98 used for the bottom-lifting member 72 and the pivoting end 66 of the handle 62, and is also pivotally connected, as at 100, to frame member 46. As may be readily understood, particularly upon progressive examination of FIGS. 4 and 5, upon closing movement 70 of handle 72, the pivotal traverse 68 that this produces in the pivoting handle ends 66 causes a translation movement in the member 96 about the pivots 98 and 100 which results in the member 96 moving in the direction 102 from a clearance position spaced from the frame member 30 into a position adjacent thereto, the latter position being illustrated in FIG. 5.

Performing the same function as the member 96, but at the strategic location rearwardly of the bag 82, is a second bag-supporting member 104. As is perhaps most clearly illustrated in FIG. 6, the ends of the arms of this member are advantageously connected to the pivots 48, 50 of the frame members 30 and 46. Additionally, at a spaced location therefrom the arms of the member 104 are pivotally connected, as at 106 and 108, respectively, to the previously noted lifting member 72 and to an additional support member 110. It is to facilitate making the pivot connection 108 for the member 104 that the bottom lifting mechanism is comprised of the two members 74 and 72, rather than a single member extended between the upper pivot 98 and the bottom pivot location 112 of the articulating bottom 52, 54. As a result of the just described connections for the member 104, in response to closing movement 70 of the handle 62, the pivotal traverse 68 in the pivoting ends 66 thereof raise the member 104 along with the raising of the member 72, and thus results in the movement of member 104 in the direction 114 which carries it into a position adjacent the upper portion of the frame 30. This, in an obvious manner, contributes to a compact condition for the cart 20.

In a preferred embodiment of the cart 20, there is also included a pedal-operated brake 116 for selectively holding wheel 36 against rotation.

To of course erect or unfold the cart 20 from its compact condition as illustrated in FIG. 5, it is merely necessary to urge handle 62 through a pivotal traverse about pivot 64 in a counter-clockwise direction. This pivotal traverse is conducted until the arms of the handle 62 align with the arms of brackets 76. When this occurs, the holding sleeves 78 are slipped over the brackets 76 thereby holding the handle 62 in an appropriate angled orientation so that it functions effectively as a hand grip for manipulating the cart 20 through movement. Also, the locking of the handle 62 in place, as just described, also holds the bottom panel members 52 and 54 in their horizontal orientation in supporting relation below the bottom of the bag 82. This follows of course from the fact that the interconnected members 72 and 74 are connected in spanning relation between the end of the handle 62 and the hinged members 52 and 54. It is of course also possible to limit the descending movement of the members 52 and 54 to a horizontal plane by proper selection of a hinge for these members which has this degree of limited movement.

In the preceding description, cart 20 has been referred to as a shopping cart since this is its primary intended end use. It will of course be understood that this reference in the description and also in the claims which follow, is not intended to be a limitation of the scope of the invention, since of course it is readily possible to use the cart 20 for purposes other than grocery shopping. For example, cart 20 of course can readily be used for transporting laundry or other such purposes.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A shopping cart foldable from an open bag-supporting condition into a closed compact storage condition comprising a pair of front wheels, a front axle connected in spanning relation between said front wheels, a first rearwardly angled frame member supported on said front axle, a pair of rear wheels, a rear axle connected in spanning relation between said rear wheels, a second cooperating forwardly angled frame member supported on said rear axle, a pivotal connection of said front and second frame members to each other to provide scissors-type opening and closing movements therebetween so as to enable said shopping cart to fold from said open condition into said closed condition, a pair of members each respectively connected along one edge to said front and rear axles and at an opposite edge hinged to each other to form a bottom for said cart supported in spanning relation between said front and rear axles, a handle for said cart pivotally connected adjacent the top of said rearwardly angled first frame member, and a bottom-folding member pivotally connected at one end to said bottom pair of members adjacent said hinge thereof and at its other end to an extension of said handle, whereby incident to pivotal movement of said handle into its storage position said bottom is correspondingly folded into its storage condition and during said folding movement causes closing movement of said first and second frame members.

2. A shopping cart as defined in claim 1 including a rear bag-supporting member pivotally connected at said pivot of said first and second frame members and to said bottom-folding member which is urged through movement in response to said pivotal closing movement of said handle, whereby said supporting member is in turn urged through a pivotal traverse into a storage position incident to closing movement of said handle.

3. A shopping cart as defined in claim 2 including a front bag-supporting member pivotally connected to said second frame member and to said pivoting end of said handle, whereby said supporting member is urged through a pivotal traverse into a storage position incident to closing movement of said handle.

4. A shopping cart as defined in claim 3 including a shopping bag adapted to be supported adjacent the tops of said first and second frame members in suspended position therebetween and interposed between said front and rear bag-supporting members so as to be held by said members in said suspended position.

5. A shopping cart as defined in claim 4 wherein said pivotal connection of said handle is spaced from the top of said first frame member to define a length portion on said frame member for connection of said handle thereto as an extension therefrom in said open bag-supporting condition of said cart.

6. A shopping cart as defined in claim 5 including tie bars oriented in spanning relation between the bottoms of said first and second frame members for connection of the bottom of said shopping bag thereto.

* * * * *